(12) United States Patent
Davis et al.

(10) Patent No.: US 7,330,870 B1
(45) Date of Patent: Feb. 12, 2008

(54) STREAMING COMPUTER SYSTEM AND METHOD WITH MULTI-VERSION PROTOCOL COMPATIBILITY

(75) Inventors: Mark E. Davis, Menlo Park, CA (US); Andrew G. Heninger, Los Altos, CA (US); Marc Jablonski, Palo Alto, CA (US); Glenn A. Marcy, Los Altos, CA (US); Michael C. Werts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/799,073

(22) Filed: Feb. 11, 1997

(51) Int. Cl.
*G06F 15/16* (2006.01)

(52) U.S. Cl. .................. 709/200; 709/217; 340/825

(58) Field of Classification Search ............. 395/650, 395/285, 200.61, 600, 712, 703, 472, 500.19; 370/453; 709/231, 160, 217, 203, 200, 230; 364/726; 707/5, 203, 511, 1, 200; 340/825, 340/44; 713/176; 717/11, 120; 719/300
See application file for complete search history.

(56) References Cited

U.S. PATENT DOCUMENTS

| | | | | | |
|---|---|---|---|---|---|
| 4,893,266 | A | * | 1/1990 | Deem ..................... | 364/726 |
| 4,912,637 | A | * | 3/1990 | Sheedy et al. ............. | 707/203 |
| 4,935,925 | A | * | 6/1990 | Williams et al. ........... | 370/428 |
| 5,278,979 | A | * | 1/1994 | Foster et al. .............. | 707/203 |
| 5,280,612 | A | * | 1/1994 | Lorie et al. ............... | 395/600 |
| 5,339,413 | A | * | 8/1994 | Koval et al. .............. | 709/314 |
| 5,347,653 | A | * | 9/1994 | Flynn et al. .............. | 707/203 |
| 5,465,299 | A | * | 11/1995 | Matsumoto et al. ........ | 713/176 |
| 5,467,472 | A | * | 11/1995 | Williams et al. ............ | 707/1 |
| 5,568,639 | A | * | 10/1996 | Wilcox et al. ............. | 707/200 |
| 5,594,910 | A | * | 1/1997 | Filepp et al. ............. | 712/28 |
| 5,613,101 | A | * | 3/1997 | Lillich ..................... | 709/230 |
| 5,649,200 | A | * | 7/1997 | Leblang et al. ........... | 395/703 |
| 5,701,480 | A | * | 12/1997 | Raz ......................... | 709/160 |
| 5,717,898 | A | * | 2/1998 | Kagan et al. .............. | 395/472 |
| 5,732,275 | A | * | 3/1998 | Kullick et al. .............. | 717/11 |
| 5,765,171 | A | * | 6/1998 | Gehani et al. ............ | 707/203 |
| 5,784,562 | A | * | 7/1998 | Diener ..................... | 709/217 |

(Continued)

OTHER PUBLICATIONS

Damaskos et al, THe BERKOM-II FlowSpec and its Mapping on ATM. IEEE 1994.*

(Continued)

*Primary Examiner*—Thong Vu
(74) *Attorney, Agent, or Firm*—Gates & Cooper LLP (57) ABSTRACT

A forward and backward compatible streaming protocol quires subsequent versions of the protocol to be purely additive relative to earlier versions. When a data segment is transmitted as a data stream, a first stream of data that is in accordance with a first version of the protocol is transmitted, with additional streams of data that are in accordance with subsequent versions of the protocol appended in sequence to the first stream of data. When a read module implements an earlier version of the protocol than a write module, the data segment is truncated to include only the data supported by the version implemented by the read module. On the other hand, when the read module implements a later version of the protocol than the write module, receipt of the data segment is terminated after the data supported by the version implemented by the write module is received.

18 Claims, 4 Drawing Sheets

U.S. PATENT DOCUMENTS

| | | | | |
|---|---|---|---|---|
| 5,790,802 | A | * | 8/1998 | Van Loom et al. .......... 709/231 |
| 5,806,078 | A | * | 9/1998 | Hug et al. .................. 707/511 |
| 5,857,205 | A | * | 1/1999 | Roth .......................... 707/203 |
| 5,889,474 | A | * | 3/1999 | LaDue .................. 340/825.49 |
| 5,893,908 | A | * | 4/1999 | Cullen et al. .................. 707/5 |
| 5,907,837 | A | * | 5/1999 | Ferrel et al. .................... 707/3 |
| 5,909,581 | A | * | 6/1999 | Park .......................... 395/712 |
| 5,953,506 | A | * | 9/1999 | Kalra et al. ................. 709/231 |
| 5,953,519 | A | * | 9/1999 | Fura ...................... 395/500.19 |
| 5,959,543 | A | * | 9/1999 | LaPorta et al. ........ 340/825.44 |
| 6,006,034 | A | * | 12/1999 | Heath et al. ................ 395/712 |
| 6,029,200 | A | * | 2/2000 | Beckerman et al. ........ 709/226 |
| 6,085,036 | A | * | 7/2000 | Bandat ....................... 717/120 |
| 6,112,226 | A | * | 8/2000 | Weaver et al. ............. 709/203 |
| 6,182,123 | B1 | * | 1/2001 | Filepp et al. ............... 709/217 |
| 6,195,701 | B1 | * | 2/2001 | Kaiserswerth et al. ...... 709/231 |
| 6,272,521 | B1 | * | 8/2001 | Jablonski et al. ........... 709/200 |
| 6,347,398 | B1 | * | 2/2002 | Parthasarathy et al. ..... 717/178 |
| 6,351,778 | B1 | * | 2/2002 | Orton et al. ................ 719/310 |
| 2003/0069922 | A1 | * | 4/2003 | Arunachalam .............. 709/203 |

OTHER PUBLICATIONS

Lilja et al, A Superassociative Tagged Cache Coherence Directory, IEEE 1994.*

RFC 1190, http://www.faqs.org/rfcs/rfc1190.html 1990.*

Netscape Plug-Ins and JavaScript, www.ncu.edu.tw/~center5/book/quebooks/javascri/sejava10.htm.*

Benhind the Scenes, http://can.dpmms.cam.ac.uk/mail/pine/low-level.html.*

Bryan, Introduction to the SGML, www.personal.u-net.com/~sgml/sgml.htm.*

Watts et al, FuzzyCOPE: Software Environment for Building Intelligent System-the Past, The Present and The Future , http://divcom.otago.ac.nz/infosci/kel/CBIIS/pubs/pdf/FuzzyCOPE.pdf.*

Serializability in object-oriented database systems, Rakow, T.C.; Gu, J.; Neuhold, E.J.; Data Engineering, 1990. Proceedings. Sixth International Conference on Feb. 5-9, 1990 pp. 112-120.*

Implementing fault-tolerant distributed applications using objects and multi-coloured actions Shrivastava, S.K.; Wheater, S.M.; Distributed Computing Systems, 1990. Proceedings., 10th International Conference on May 28-Jun. 1, 1990 pp. 203-210.*

* cited by examiner

STREAMING COMPUTER SYSTEM AND METHOD WITH MULTI-VERSION PROTOCOL COMPATIBILITY

BACKGROUND OF THE INVENTION

1. Field of the Invention

The invention is generally related to the storage and retrieval of data from streams, and in particular, to a manner of supporting multiple versions of a streaming protocol.

2. Description of Related Art

Streaming provides a mechanism for the storage and retrieval of persistent data in a computer system, or for the transmission of data between computer system modules, whether or not they are within the same computer system. With streaming, data is embedded in data streams that follow a predetermined streaming protocol to enable a module that receives a data stream to reliably decode and retrieve the data therefrom.

Many streaming protocols are designed to support the transmission of information between modules irrespective of their underlying hardware and/or software platforms. This is a particular concern with distributed and open computer systems, where computing tasks may be broken up and handled on multiple computers or multiple applications within a computer by passing objects between the computers or applications. With distributed systems, e.g., OMG's Common Object Request Broker Architecture (CORBA), IBM's Distributed System Object Component (DSOM), etc., often the underlying platforms may vary, and a module may not be able to direct data to a particular computer, or if it can, may not be able to detect the underlying platform of the receiving computer. Likewise, a module that formats an object for transmission to or use by another module in a separate application or computer may not be able to detect the particular application which will ultimately utilize the object, e.g., as with IBM's OpenDoc, Microsoft's Object Linking and Embedding (OLE), etc.

One concern that is raised with respect to such streaming protocols is that of release-to-release data compatibility. In particular, as computer systems and applications are upgraded, streaming protocols may likewise be upgraded to support enhanced functionality. The upgraded computer systems and applications, however, may still be required to communicate with computer systems and applications that only support earlier releases, or versions, of a streaming protocol. Likewise, the earlier versions may be required to communicate with computer systems and applications that support the newer versions. Since it is often difficult, if not impossible, to detect supported versions of a streaming protocol, some incompatibilities may occur.

Such incompatibilities may be eliminated by upgrading all computers and applications in a computer system to support the same streaming protocol, but this is often not feasible due to cost or control issues.

Therefore, a significant need exists for a manner of ensuring release-to-release data compatibility of streaming protocols within a computer system.

SUMMARY OF THE INVENTION

The invention addresses these and other problems associated with the prior art in providing a streaming protocol whereby subsequent versions of a protocol are purely additive relative to earlier versions. When a data segment is transmitted as a data stream, a first stream of data that is in accordance with a first version of the protocol is transmitted, with additional streams of data that are in accordance with subsequent versions of the protocol appended in sequence to the first stream of data. A write module that transmits the data stream appends all such streams of data up to and including the stream of data that is in accordance with the version of the streaming protocol implemented by the write module.

At the receiving end, a read module receives the first stream of data, as well as each additional stream of data up to and including that which is in accordance with the version of the protocol that is implemented by the read module. If the end of the data segment is detected prior to receiving all of the data expected by the read module (indicating that the version of the write module was earlier than that of the read module), the read module will detect this and handle the prior version of the data segment accordingly. Moreover, if the end of the data segment is not detected after receiving all of the data expected by the read module (indicating that the version of the write module was later than that of the read module), any remaining data in the data segment is disregarded. Consequently, forward and backward compatibility between streaming protocol versions are concurrently supported.

These and other features, which characterize the invention, are set forth in the claims annexed hereto and forming a further part hereof. However, for a better understanding of the invention, and of the various advantages and objectives attained by its use, reference should be made to the Drawing, and to the accompanying descriptive matter, in which there is described illustrated embodiments of the invention.

BRIEF DESCRIPTION OF THE DRAWINGS

Referring now to the Drawings in which like reference numbers represent corresponding parts throughout.

DETAILED DESCRIPTION OF EXEMPLARY EMBODIMENTS

In the following description, reference is made to the accompanying drawings which form a part hereof, and which is shown by way of illustration, embodiments of the invention. It is understood that other embodiments may be utilized and structural changes may be made without departing from the scope of the present invention.

Hardware Environment

Figure 1:
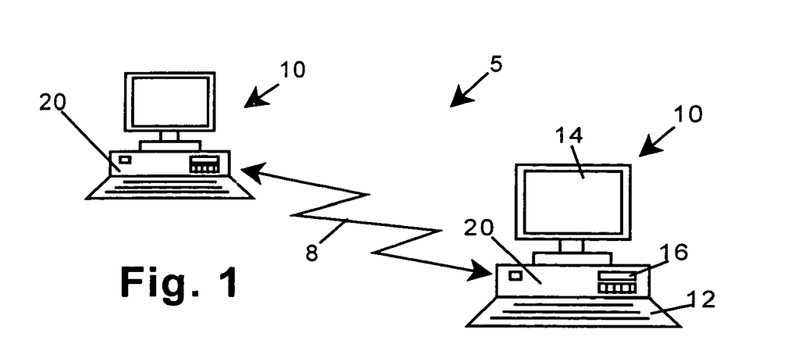
FIG. 1 is a block diagram of an exemplary hardware environment for use with the illustrated embodiments of the invention.

FIG. 1 is an exemplary hardware environment used to implement an illustrated embodiment of the invention. The present invention is typically implemented in a computer system 5 which may include one or more computers 10, e.g., in a stand-alone environment, or, as shown in FIG. 1, in a connected network 8. For example, it is over network 8 that data streams may be passed between each computer 10. Network 8 may be, for example, a LAN, a WAN, or a public network such as the Internet.

It is envisioned that attached to each of computers 10 may be a monitor 14 (e.g., a CRT, an LCD display or other display device); and non-volatile storage 16 (e.g., hard, floppy, and/or CD-ROM disk drives). Also included may be various input devices, for example, a keyboard 12.

Generally, the computer programs (illustrated at 20) which implement the illustrated embodiments of the invention are tangibly embodied in a computer-readable medium, e.g., one or more of the fixed and/or removable data storage data devices 16. Under control of computer 10, the computer programs may be loaded from the data storage devices 16 into the memory of computer 10. The computer programs comprise instructions which, when read and executed by computer 10, cause computer 10 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Implementation

The illustrated embodiments of the invention generally provide release-to-release data compatibility over multiple versions of a streaming protocol by requiring version modifications to the streaming protocol to be purely additive, so that a data stream output in accordance with a streaming protocol includes data segments sequenced according to each version of the streaming protocol up to and including the version implemented in the write module outputting the data stream. A read module which receives the data stream includes forward compatibility by disregarding any data related to later versions after all of the data up to and including the version of the module has been received. Backward compatibility is provided by detecting premature end tags and handling the unreceived data accordingly.

Figure 2:
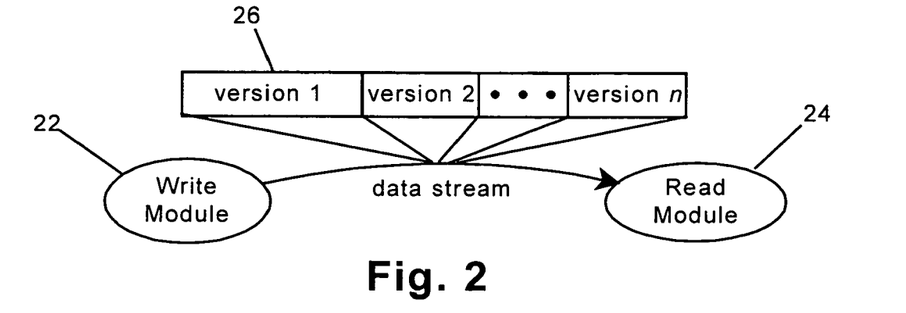
FIG. 2 is a block diagram illustrating the transmission of a data stream between write and read modules consistent with the principles of the present invention.

As shown in FIG. 2, illustrated embodiments of the invention are generally implemented in write modules, such as write module 22, which output a data stream, and read modules, such as read module 24, which receive the data stream. It should be appreciated that the read and write modules may be software objects or components having one or more methods or routines that implement the functionality of the modules, and that the modules may be resident on the same computer, e.g., in different computer programs or applications that may communicate via streaming (as in OpenDoc and OLE). Moreover, the read and write modules may be resident on different computers within a networked computer system (e.g., in a distributed computer system such as DSOM or CORBA). Furthermore, the read and write modules need not be implemented on the same hardware and/or software platform (e.g., where a write module is implemented on a UNIX platform and a read module is implemented on a PC platform).

Data streams consistent with the invention are typically tag-delimited and may include data segments which represent objects and/or primitive data types. In addition, aliasing may be supported, whereby special information is written to the data stream to enable reconstruction of aliased pointers in the event that multiple pointers refer to the same data.

The data streams may be more or less serial, where all of the information required to reconstruct an object from a data segment is stored within the data segment. Consequently, no additional information, e.g., a separate database, need be streamed out at the end of a data stream as is required with some conventional streaming methods. Moreover, the data streams need not be random access streams, although random access streams may also be supported.

The data streams are output by write modules in formats that are dictated by a streaming protocol which may be revised from time to time, thereby forming a plurality of versions of the streaming protocol. Consistent with the invention, revisions to the streaming protocol are purely additive, and are appended to one another in sequence. For example, FIG. 2 illustrates a data stream having a data segment 26 which includes, in sequence, streams of data according to versions 1 to n of a streaming protocol.

A write module may be considered to implement a particular version of a streaming protocol when the write module outputs data in the format dictated by that version of the streaming protocol. Likewise, data streams are received by read modules which expect the data to be formatted according to particular versions of a streaming protocol. A read module may therefore be considered to implement a particular version of a streaming protocol when the read module expects to receive data in the format dictated by that version of the streaming protocol.

Figure 3:
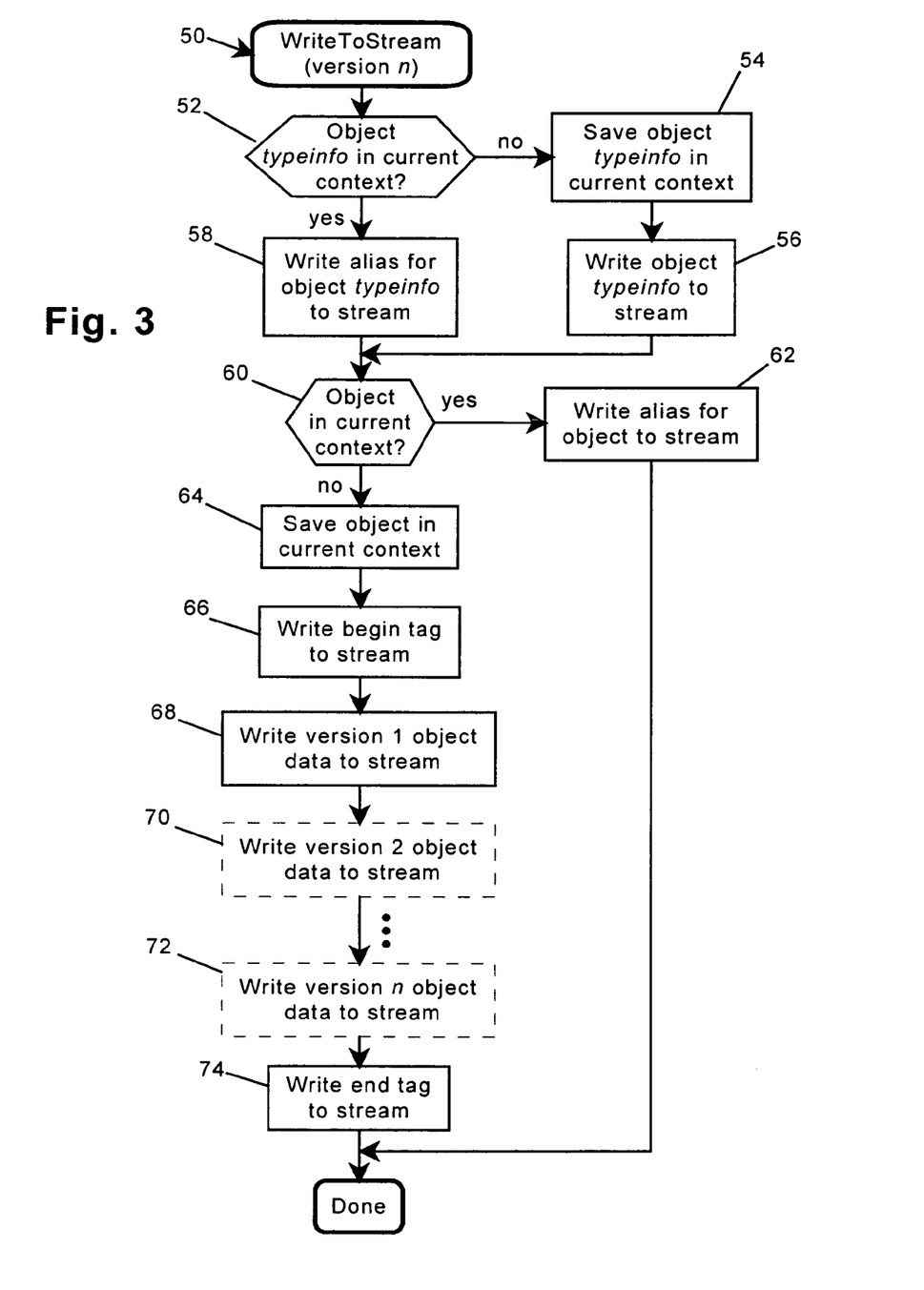
FIG. 3 is a flowchart of a WriteToStream routine consistent with the principles of the invention.

FIG. 3 illustrates a WriteToStream routine 50 for execution by a write module to stream out a data segment (here, a particular object) comprising a sequence of streams of data. For illustrative purposes, routine 50 may be considered to implement a version n of a streaming protocol. A corresponding ReadFromStream routine 100, which implements a version m of the streaming protocol is shown separately in FIG. 4. Routine 50 supports object aliasing, whereby subsequent references to objects that have been written to a stream may be replaced by alias tags, rather than writing additional copies of the object to the stream. However, it should be appreciated that support for aliasing may be omitted in some applications.

Routine 50 outputs a tag-delimited data stream whereby object data is preceded by a begin tag and followed by an end tag. In addition, alias tags are also used to point to the location of information in the data stream that is being aliased. Each tag may include an identifier field for identifying the type of tag, e.g., begin tag, end tag, object type tag, object alias tag, object type alias tag, etc. Each tag may also include a pointer field that points to another location in the data stream. Other tag formats may be used in the alternative.

Routine 50 begins in block 52 by determining whether an object type for the object, typeinfo, is stored in the current context. Typeinfo provides an object type for the object so that the object may be allocated and initialized (e.g., by calling an appropriate default constructor) to recreate the object. The current context is an object that maintains a record of the objects and object types therefor that have been written to a data stream. Each entry in the current context preferably includes an object type for the object, as well as a pointer to the location of the data in the data stream. It should be appreciated that the current context may be initialized in a separate routine, or in the alternative, routine 50 may initialize the current context if the routine determines that this has not been so done.

If the object type is not in the current context, the object type is saved in the current context in block 54, then the object type tag is written to the stream. If, on the other hand, the object type is in the current context, an alias tag is written to the stream in block 58. The pointer for the alias tag includes the byte offset in the data stream to the object type being referenced by the alias tag.

Next, in block 60, routine 50 determines whether the object itself is in the current context. If it is, then an alias tag, which points back to the first instance of the object in the data stream, may be written to the stream in block 62, whereby no further processing is required. The alias tag may be configured similar to the alias tag for the object type, with the pointer for the alias tag including the byte offset in the data stream to the object data being referenced thereby.

If, on the other hand, the object is not stored in the current context, the object is saved in the current context in block 64. Next, in block 64, a begin tag is written to the stream to delimit the start of the data for the object. The pointer for the begin tag may include, for example, the byte offset in the data stream to the matching end tag for the object.

Next, in block 68, all of the data for the object in accordance with the earliest (first) version of the streaming protocol is written to the stream in block 68. Any additional data for the object that is supported by subsequent versions of the streaming protocol up to and including the version n being implemented by routine 50 is thereafter appended to this data, as shown by blocks 70-72. Data for each version may be appended sequentially in order from earliest to latest version, with the current version implemented by the routine coming last in the data stream.

Each separate piece of data, for example, primitive fields, does not require tagging. Only version tags are required. This provides significant savings in stream storage as well as higher read performance. Moreover, information to support polymorphic streaming only need be emitted when necessary. The source write operation may determine the type of the object and compare it to the type of pointer. Information necessary to support a polymorphic read operation need only be stored in the stream if the type of object and the type of pointer are different. This represents very substantial savings in storage, write performance and especially read performance.

Once all of the data for the object is written to the data stream, the end tag, which matches the begin tag written in block 66, is written to the data stream in block 74. The pointer for the end tag generally includes the byte offset to the next tag in the data stream. After the end tag is written to the data stream, streaming of the object is complete.

It should be appreciated that routine 50 as shown in FIG. 3 is merely a template for streaming out a generic object, and thus may be provided in a framework or class library and modified by a programmer to tailor the routine depending upon the particular data structure of an object to be streamed out. Typically, blocks 68-72 of routine 50 are customized to stream out suitable object data for a specific object to the data stream. In practice, the object data may vary greatly depending upon the particular object being written, as well as the version of the streaming protocol being used to stream out the object.

Figure 4:
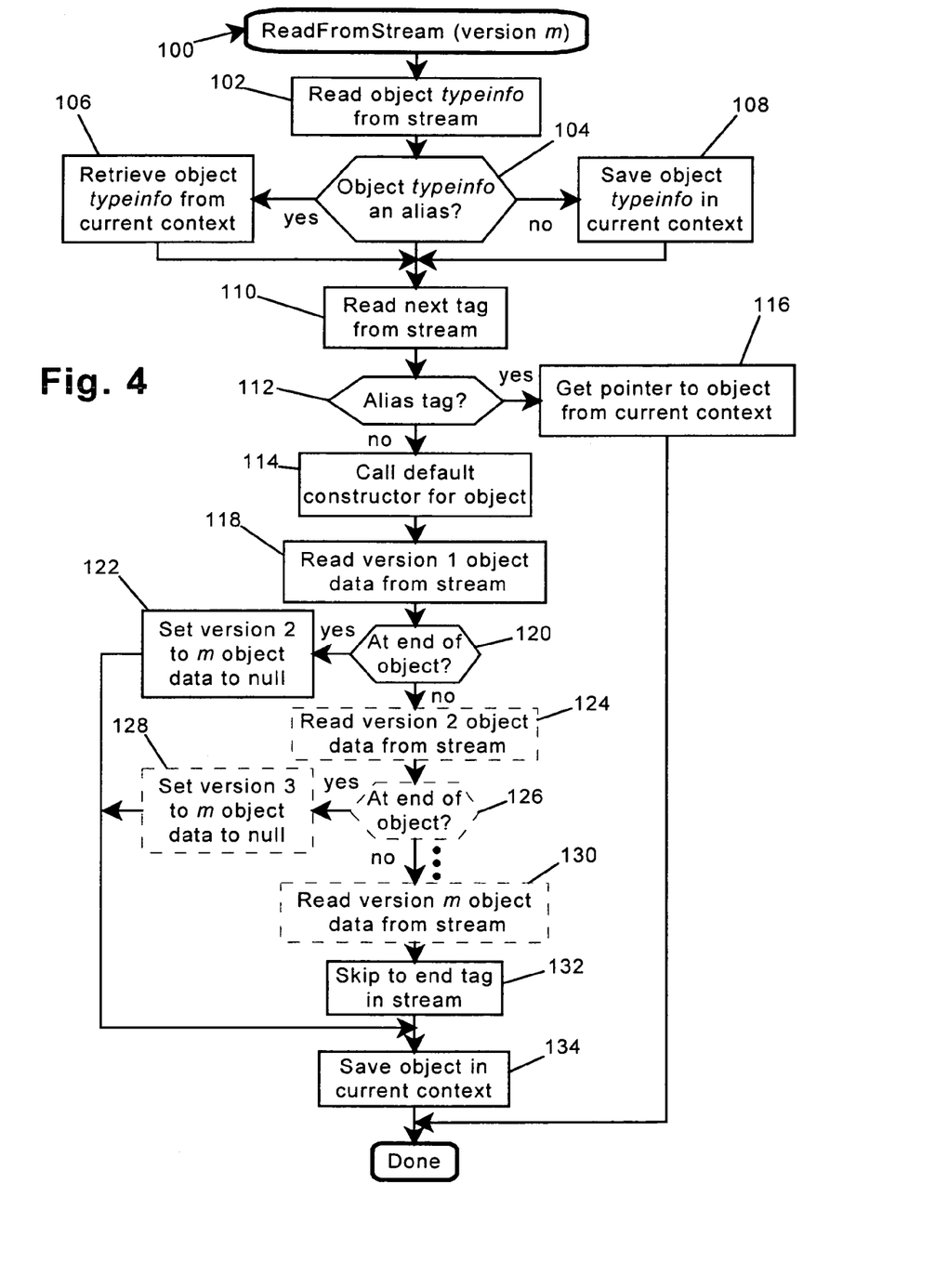
FIG. 4 is a flowchart of a ReadFromStream routine consistent with the principles of the invention.

FIG. 4 illustrates a corresponding ReadFromStream routine 100 for execution by a read module to read in the data segment (here, an object) written to the data stream by routine 50. For illustrative purposes, routine 100 may be considered to implement a version m of a streaming protocol.

Routine 100 begins at block 102 by reading the object type typeinfo from the data stream. Next, it is determined whether the object type is an alias tag in block 104. If it is, control passes to block 106 to retrieve the object type from the current context. If it is not, control passes to block 108 to save the object type in the current context. As with routine 50, it may also be necessary to initialize the current context if not previously so done.

In either event, control next passes to block 110 to read the next tag from the data stream. Next, it is determined in block 112 whether this tag is an alias tag. If it is, then control passes to block 116 to retrieve from the current context the pointer to the previously-created object referenced by the alias tag, whereby retrieval of the object is then complete.

Otherwise, control passes to block 114 to allocate and initialize the object by calling the default constructor for the object based upon its object type received from either the data stream or the current context. As noted above, the default constructor is the program code that forms a template for how to build an object from the forthcoming data in the data stream. It is the default constructor which typically defines what version of a streaming protocol is supported, since the default constructor expects to receive object data in a predetermined format. Other manners of allocating and initializing the object may be used in the alternative.

Next, control passes to block 118 to read the object data according to the first version of the streaming protocol from the data stream. At this time, the data is also used to build the object based upon the template provided by the default constructor.

Next, in block 120, it is determined whether the end of the object has been detected, typically by checking if an end tag is received when it is not expected. If so, this indicates that an earlier version of the streaming protocol was used to stream out the object data (i.e., n<m). In this case, control passes to block 122 to initialize (e.g., set to null or another default value) all of the object data according to each subsequent version of the streaming protocol (up to and including the version m implemented by routine 100). It may also be necessary to include suitable program code in any other routines that handle the object to detect and specially handle the default values. Upon completion of initializing the object data, control passes to block 134 to save the object in the current context, whereby streaming in of the object is complete.

Returning to block 120, if the end of the object is not detected, blocks 124-130, which are similar in operation to blocks 118-122, read in the object data according to the subsequent versions of the streaming protocol up to version m implemented by routine 100. Also, between reading in the object data according to each subsequent, premature ends of blocks are detected in order to maintain backward compatibility and initialize any object data not supplied in the data stream.

Forward compatibility is provided by block 132, which skips to the end tag for the object in the data stream if the end tag has not yet been reached after reading in the object data according to version m of the streaming protocol (which typically occurs when n>m). Thus, any object data supplied for later versions of the streaming protocol is disregarded in building the object. However, any skipped data may be stored in the current context for later retrieval, e.g., as required for aliasing. Control then passes to block 134 to save the object in the current context, whereby streaming in of the object is complete.

It should be appreciated that routine 100 is a general template for a streaming routine which does not implement a first version of a streaming protocol (i.e., m>1). To use this routine as a template for implementing a first version of a streaming protocol, blocks 120-130 may be omitted, given that the receipt of premature end tags is generally not a concern.

To illustrate the operation of routines 50 and 100 in providing forward and backward compatibility, two versions of a streaming protocol that is implemented as a streamable class Apple are set forth in Tables I and II below. The object data for the first version of Apple includes the instances of two objects: Orange and Banana. The object data for the second version of Apple includes a second instance of the Banana class, fExtBanana. This additional object data is appended in the data stream following the instances of Orange and Banana.

The Apple class is a polymorphically streamable C++ class. The Orange and Banana classes, which are utilized by the Apple class, are also polymorphically streamable C++ classes; however, the details of these classes are not important for an understanding of the invention.

TABLE I

First Version of Streaming Protocol

```
class Apple {
public:
    ...
    virtual void writeToStream(IDataStream& toWhere) const;
    virtual void readFromStream(IDataStream& fromWhere);
    ...
private:
    Orange *fOrange;
    Banana *fBanana;
};
void Apple::writeToStream(IDataStream& toWhere) const {
    IStreamOutFrame    myStreamOutFrame;
    fOrange->writeToStream(toWhere);
    fBanana->writeToStream(toWhere);
}
void Apple::readFromStream(IDataStream& from Where) {
    IStreamInFrame    myStreamInFrame;
    fOrange->readFromStream(fromWhere);
    fBanana->readFromStream(fromWhere);
}
```

TABLE II

Second Version of Streaming Protocol

```
class Apple {
public:
    ...
    virtual void writeToStream(IDataStream& toWhere) const;
    virtual void readFromStream(IDataStream& fromWhere);
    ...
private:
    Orange *fOrange;
    Banana *fBanana;
    Banana *fExtBanana;
};
void Apple::writeToStream(IDataStream& toWhere) const {
    IStreamOutFrame    myStreamOutFrame;
    fOrange->writeToStream(toWhere);
    fBanana->writeToStream(toWhere);
    fExtBanana->writeToStream(toWhere);
}
void Apple::readFromStream(IDataStream& fromWhere) {
    IStreamInFrame    myStreamInFrame;
    fOrange->readFromStream(fromWhere);
    fBanana->readFromStream(fromWhere);
    if (!myStreamInFrame.atEnd( ))
        fExtBanana->readFromStream(fromWhere);
    else
        fExtBanana = NULL;
}
```

The writeToStream method for each version of the Apple class generally represents the object data writing steps 68-72 of routine 50. Similarly, the readFromStream method for each version of the Apple class generally represents the object data reading steps 118-130 of routine 100.

Backward compatibility may be illustrated by streaming out a first version of Apple and streaming in the second version of Apple. Suitable code for streaming out Apple is illustrated below in Table III below:

TABLE III

Stream Out Code - Backward Compatibility

```
IDataStream*      myDataStream = . . .
Apple*            myApple = new Apple ( );
. . .
myApple->writeToStream(*myDataStream);
```

Figure 5:
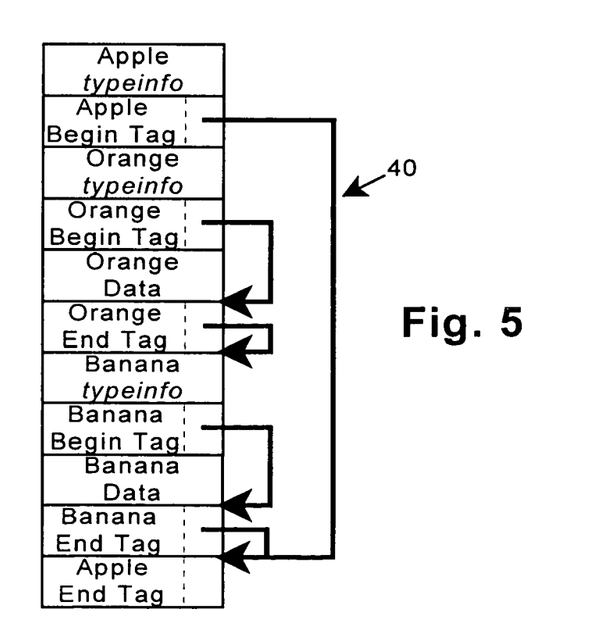
FIG. 5 is a block diagram of an exemplary data stream consistent with the invention.

The format of the data stream generated by the above code is illustrated by data stream 40 in FIG. 5, whereby pointers from each tag are represented by arrows pointing to the targets of the pointers. It is assumed that none of Apple, Orange, and Banana have previously been output to the data stream, and thus, no aliasing is utilized when outputting the object data for Apple. As discussed above in relation to routine 50 of FIG. 3, when no aliasing occurs, the general output to a data stream includes an object type tag, a begin tag, the object data, and an end tag.

Referring to the first version of the Apple class in Table I, the object data for the first version of Apple includes Orange and Banana, and thus the two WriteToStream calls made in the WriteToStream method in the Apple class correspond generally to block 68 of routine 50 (FIG. 3). Moreover, since this is the first version of the Apple class, blocks 70-72 are omitted. Each of Orange and Banana also output data in the same general manner as routine 50, and thus the object data portion of the data stream for Apple includes an object type tag, a begin tag, object data, and an end tag for both Orange and Banana.

Streaming in of the data stream of FIG. 5 follows the general program flow of routine 100 of FIG. 4. Here, the statements in the readFromStream method of Table II correspond generally to blocks 118-124 of routine 100, with blocks 126-130 omitted since this is the second version of the Apple class. Here, since the readFromStream method for the second version of the Apple class receives the end tag for Apple prior to receiving any fExtBanana object, this object is initialized to null.

Forward compatibility may be illustrated by streaming out a second version of Apple and streaming in the first version of Apple. Suitable code for streaming out the second version of Apple is illustrated below in Table IV below. Moreover, to illustrate aliasing, the streaming out of an additional instance of Banana is performed following Apple.

TABLE IV

Stream Out Code - Forward Compatibility

```
IDataStream*      myDataStream = . . .
Apple*            myApple = new Apple( );
Banana*           myBanana = new Banana( );
myBanana = myApple.fExtBanana;
. . .
myApple->writeToStream(*myDataStream);
myBanana->writeToStream(*myDataStream);
```

Figure 6:
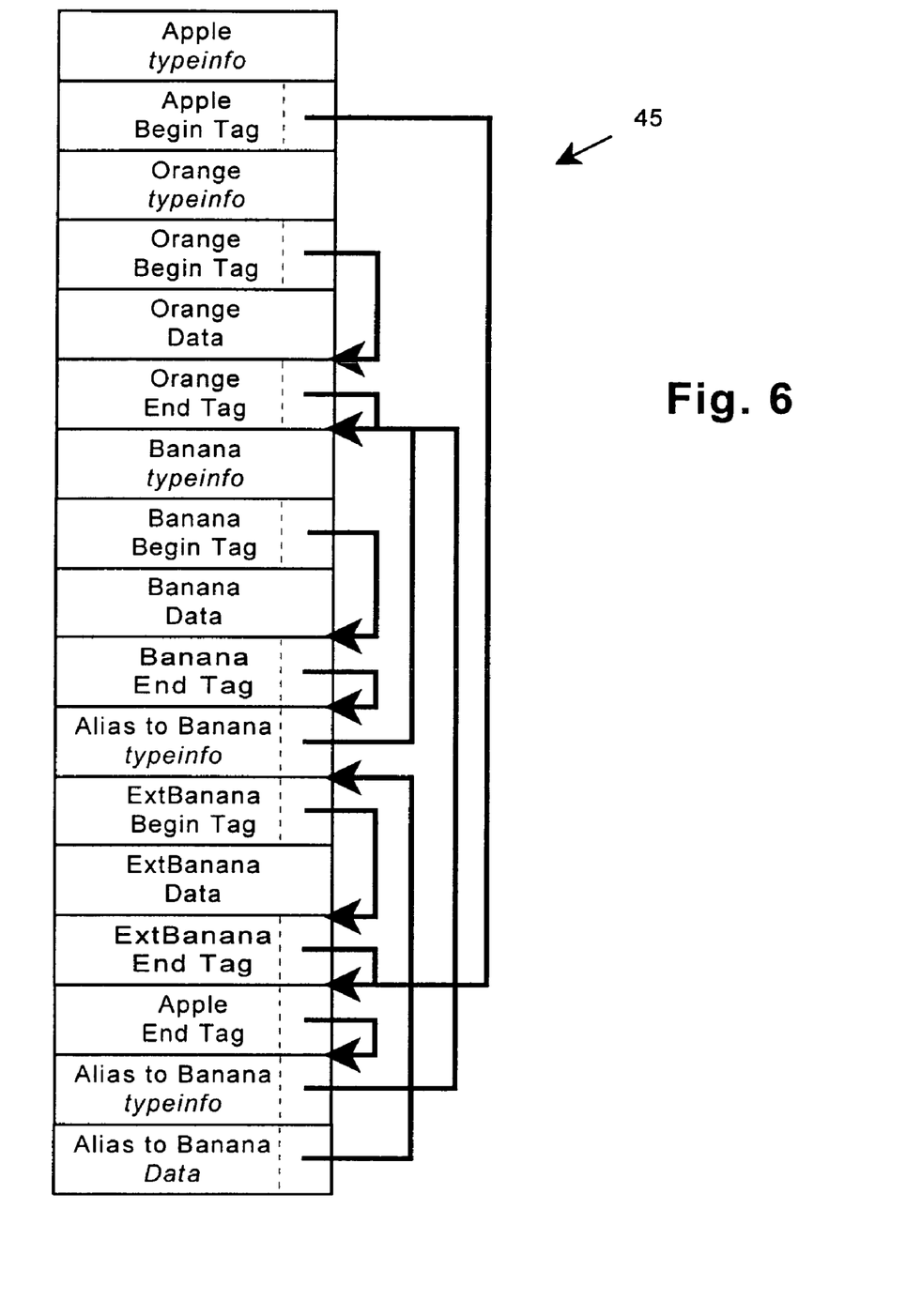
FIG. 6 is a block diagram of another exemplary data stream consistent with the invention.

The format of the data stream generated by the above code is illustrated by data stream 45 in FIG. 6, with pointers from each tag represented by arrows pointing to the targets of the pointers. Referring to the second version of the Apple class in Table I, the object data for the first version of Apple includes Orange and Banana, and thus the first two WriteToStream calls made in the WriteToStream method in the Apple class correspond generally to block 68 of routine 50 (FIG. 3). The data according to the second version of the streaming protocol, fExtBanana, is streamed out after Orange and Banana, and thus, the last WriteToStream call made in the WriteToStream method in the Apple class corresponds generally to block 70 of routine 50.

Also, as may be seen from the data stream of FIG. 6, when fExtBanana is streamed out, the object type therefor is already stored in the current context as a result of streaming out fBanana. Consequently, an alias tag for the fExtBanana object type is streamed out instead the object type itself.

As an illustration of aliasing, after Apple is streamed out, myBanana is streamed out. Since both the object type and the object itself have been streamed out with Apple, both are stored in the current context. Thus, when myBanana is streamed out, alias tags for the object type and the object are output to the data stream in lieu of the actual object data.

Streaming in of the data stream of FIG. 6 also follows the general program flow of routine 100 of FIG. 4. Here, the statements in the readFromStream method of Table I correspond generally to block 118 of routine 100, with blocks 120-130 omitted since this is the first version of the Apple class. When the object data for Apple is read in, only Orange and Banana (the data according to the first version of Apple) are read in. The readFromStream method terminates, and the remaining object data in Apple is disregarded (see block 132 of FIG. 4). This is implemented in the Apple class by virtue of IStreamInFrame being a scoped object whose scope ends after Banana is streamed in. A destructor method (not shown) is called when the scope of IStreamInFrame ends to skip to the end of Apple. Consequently, for data stream 45, the object data between the Banana end tag and the Apple end tag may be disregarded and skipped, thereby providing forward compatibility for the Apple class. This data may, however, be stored in the current context for retrieval by aliased objects.

For streaming in the aliased myBanana after streaming in Apple, the alias tags for the Banana object type and the Banana object itself are read, and then the object type and object data are read out from the current context (i.e., as shown by blocks 108 and 116 of routine 100 in FIG. 4). Streaming in of data stream 45 is then complete.

Various modifications may be made to the illustrated embodiments without departing from the spirit and scope of the invention. For example, other actions may be taken than initializing object data to a null or other default value when reading a data stream generated according to an earlier version of the streaming protocol.

Other modifications will be apparent to one skilled in the art. Therefore, the invention lies solely in the claims hereinafter appended.

What is claimed is:

1. A method of transmitting a data segment in a data stream using a write module which implements a selected one of a plurality of versions of a streaming protocol wherein each subsequent version of the streaming protocol is additive to a previous version, the method comprising the steps of:
    (a) outputting a first stream of data according to a first version of the streaming protocol;
    (b) sequentially appending additional streams of data to the first stream of data according to each subsequent version of the streaming protocol up to and including the selected version, if the selected version of the streaming protocol is not the first version of the streaming protocol; and
    (c) delimiting the data segment in the data stream using begin and end tags.

2. The method of claim 1, further comprising the step of receiving the data segment from a data stream using a read module of the type which implements a second selected one of the plurality of versions of the streaming protocol, the receiving step including the steps of:
    receiving the first stream of data;
    if the second selected version is earlier than the first selected version, receiving each additional stream of data according to each subsequent version of the streaming protocol up to and including the second selected version, and disregarding any remaining data in the data segment;
    if the second selected version is equal to or later than the first selected version, sequentially receiving the additional streams of data according to each subsequent version of the streaming protocol up to and including the second selected version; and
    testing, prior to receiving each additional stream of data, whether an end of the data segment has been detected, and if so, terminating reception of the data segment prior to receiving the additional stream of data according to the second selected version.

3. The method of claim 2, wherein the read and write modules are resident on the same computer.

4. The method of claim 2, wherein the read and write modules are resident on separate computers.

5. The method of claim 2, wherein the data segment is an object.

6. The method of claim 5, wherein the data segment includes all of the data necessary to reconstruct the object; whereby the data stream is serial.

7. The method of claim 5, wherein the testing step includes the step of initializing object data that is not received from the data stream to a default value.

8. The method of claim 5, further comprising the steps of:
    transmitting an object type for the data segment; and
    receiving the object type, including allocating and initializing an object when receiving the data segment based upon the object type.

9. The method of claim 1, wherein no additional tags are embedded in the data segment between the begin and end tags.

10. The method of claim 1, further comprising the steps of:
    determining whether the data segment is stored in a current context for the data stream;
    if so, transmitting an alias Tag in lieu of the data segment; and
    if not, storing the data segment in the current context.

11. The method of claim 1, wherein the data stream is a non-random access data stream.

12. A method of receiving a data segment from a data stream using a read module which implements a selected one of a plurality of versions of a streaming protocol wherein each subsequent version of the streaming protocol is additive to a previous version, the method comprising the steps of:
    (a) receiving a first stream of data according to a first version of the streaming protocol;
    (b) if the selected version of the streaming protocol is nor the first version of the streaming protocol, sequentially receiving additional streams of data according to each subsequent version of the streaming protocol up to and including the selected version; and (c) testing, prior to receiving each additional stream of data, whether an end of the data segment has been detected, and if so, terminating reception of the data segment prior to receiving the additional stream of data according to the selected version.

13. The method of claim 12, further comprising the step of, if the end of the data segment has not been detected upon receiving the additional stream of data according to the selected version, disregarding any remaining data in the data segment.

14. The method of claim 13, further comprising the step of storing the data segment in a current context including any disregarded data therefrom.

15. The method of claim 12, wherein the data segment is an object.

16. The method of claim 15, wherein the testing step includes the step of initializing object data that is not received from the data stream to a default value.

17. The method of claim 15, further comprising the steps of:

receiving an object type for the data segment; and allocating and initializing an object based upon the object type to build the object from the streams of data in the data segment.

18. The method of claim 12, wherein the step of testing whether and end of the data segment has been detected comprises the step of testing for a premature end tag and terminating the reception of the data segment when a premature end tag is received.

* * * * *